P. Donald Brehm
INVENTOR.

P. Donald Brehm
INVENTOR.

April 4, 1967 P. D. BREHM 3,312,510
PRECISION SPINDLE

Filed Oct. 18, 1965 3 Sheets-Sheet 3

P. DONALD BREHM
INVENTOR.

BY

United States Patent Office 3,312,510
Patented Apr. 4, 1967

3,312,510
PRECISION SPINDLE
Paul Donald Brehm, 3 Phil Lane, Keene, N.H. 03431
Filed Oct. 18, 1965, Ser. No. 497,390
6 Claims. (Cl. 308—9)

ABSTRACT OF THE DISCLOSURE

This is a mechanical spindle, rotatable and movable axially; it rides on air pressure pads to eliminate friction; a flat plate, the plane of which is adjustable with respect to the axis of the spindle, is mounted on the spindle to provide a staging platform from which the surfaces of machined parts may be presented for contact with precision gaging devices which thus measure and record roundness, straightness and other dimensional characteristics.

My invention relates to precision gaging fixtures and relates more particularly to an ultra-precision spindle upon which is carried a staging plane surface which is rotatable and which may also be translated axially along a line which is also the axis of rotation of and which may be normal to said surface.

In my co-pending application, Ser. No. 313,111, filed Oct. 1, 1963, now abandoned, I disclose a precision spindle capable of rotation with less than three millionths of an inch (.000003″) total runout. In accordance with the present invention, I provide such a spindle which in addition combines rotational accuracies of the order mentioned with axial motion along a theoretical line with deviations of less than one millinth of an inch (.000001″) per inch of travel.

Such a device is extremely useful in staging parts which must be made (and therefore measured) to extremely high accuracies, with both roundness and straightness being crucial and interrelated factors. By combining the motions required for checking all geometric parameters, it will be seen that meaningful relationships are readily indicated.

The data thus obtained may be used to control the production process as well as to separate the acceptable from unacceptable components being inspected.

For a complete understanding of my invention, reference may be had to the following description and the accompanying drawings in which FIGURE 1 is a view, in section, of the entire spindle assembly embodying the invention;

Figure 1:
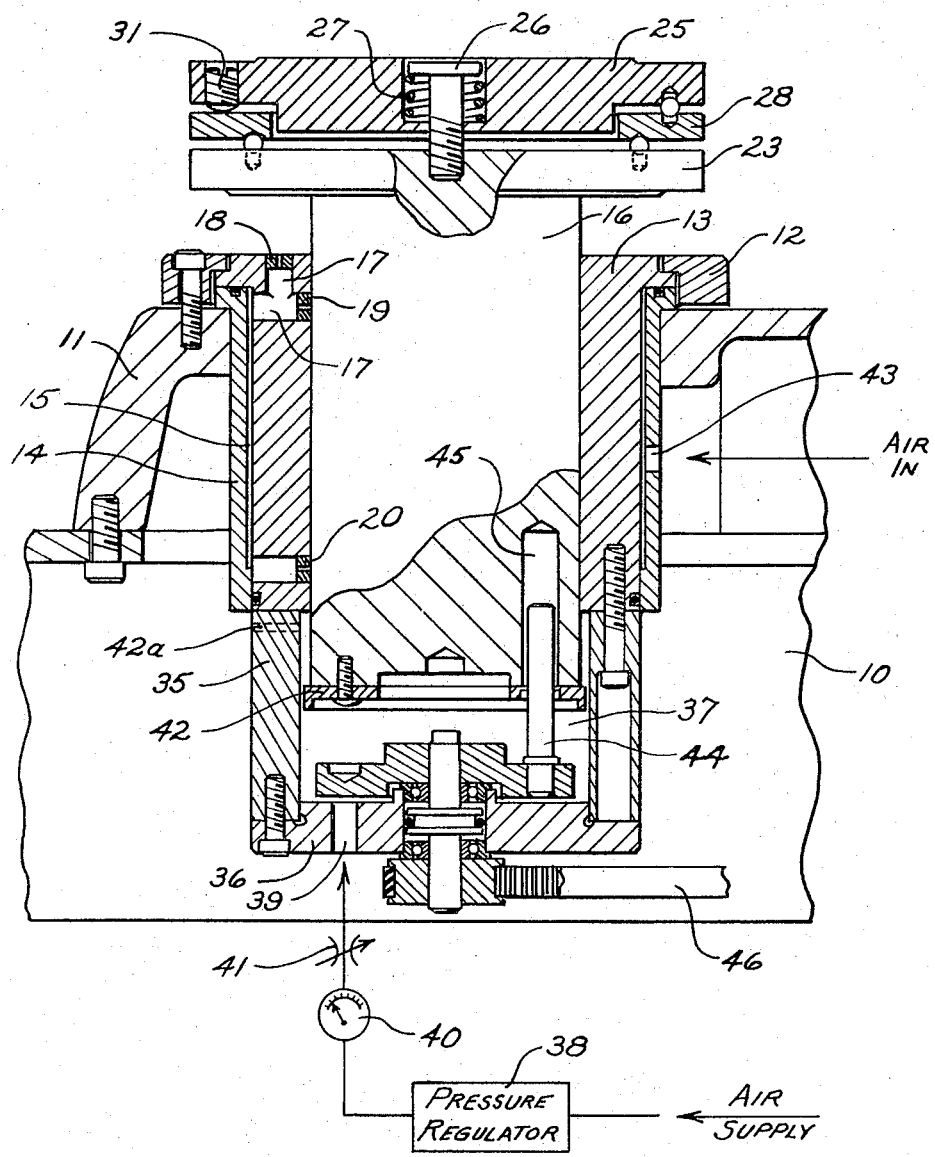

Referring now more particularly to FIGURE 1, a base 10 is providtd and upon which is mounted a bracket 11 and ring 12. These elements secure by clamping a tubular bearing member 13 which nests in an outer coaxial shell 14. An annular space 15 between member 13 and shell 14 serves as a manifold for the introduction of air under pressure as will hereinafter be explained.

The central bore defined by bearing member 13 contains a solid spindle 16 which fits slidably therein. I recommend that the spindle 16 be round to within 5 to 10 micro-inches, and that the bore be round to within 50 to 60 micro-inches. These tolerances, while close, are not difficult to obtain on conventional modern machine tools. Yet the final accuracy of my device exceeds the accuracy of the component parts by the use of an air film for final centering and support. I prefer to keep the diameter of the spindle 16 about .001″ less than the diameter of the bore in member 13 so that under dynamic conditions there is no metal-to-metal contact, either when the spindle 16 is rotated or when it is translated axially.

On the periphery of the upper end of member 13, I provide a series of apertures defined by drilled holes 17 into which are press fitted plugs 18 and 19 having air passages drilled therethrough. The purpose of these plugs is twofold; first, the size of the air passages therein may be more easily controlled by producing the plugs in a common process; and, secondly, they provide a pressure pad space of easily established and carefully defined dimensions between the plugs and the adjacent, moving surfaces.

The plugs at the top of the spindle are arranged in pairs, one horizontal and the other vertical, as shown, and they are arranged around the entire circumference of the spindle 16 in regular spacing, every twenty degrees, for example.

Similar plugs 20 are arranged in spaced relation around the lower region of member 13 as shown. It will be understood that the surface of the plugs 18 and 19 are set a few thousandths of an inch below the inner surface of the bore in member 13 in the case of plugs 19 and 20 and below the top surface of member 13 in the case of plugs 18. Thus small cavities are formed to provide pressure support pads.

Figure 3:
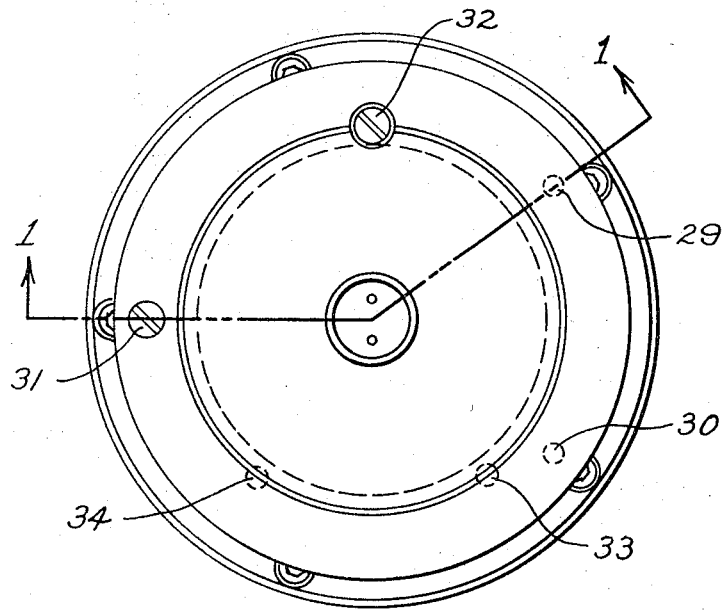
FIGURE 3 is a plan view of work table of FIGURE 2

On the spindle 16 and integral therewith is a thrust plate 23. Mounted thereon is a work table 25 which is biased toward the plate 23 by a screw 26 and spring 27. Between the table 25 and the plate 23 I provide an intermediate tilt ring 28. The table 25 rocks in one vertical plane about tilt balls 29 and 30, disposed as shown in FIGURE 3. A tilt screw 31 is threaded into the work table 25 and bears on the intermediate tilt ring 28. The spring 27 serves to keep the screw 31 pressed against the ring 28. Thus it can be seen that turning the screw 31 varies the angular relationship between the table 25 and the intermediate tilt ring 28.

At 90 degrees from the foregoing line of action a similar arrangement obtains between the tilt ring 28 and the plate 23. A tilt screw 32 between the ring 28 and the plate 23 provides an angular adjustment between those members, rocking on tilt balls 33 and 34. The lower tilt screw 32 is reached through an aperture in the outer edge of the table 25.

The top of the work table 25 is lapped to a flat surface which may be of almost optical precision. With fine pitch tilt screws 31 and 32, the angular relationship of this lapped surface with the axis of rotation of the spindle 16 may be adjusted to any value within the range of travel. Of course, perfect squareness is usually required for conventional measurements.

It will be appreciated from the foregoing that high orders of accuracy are achieved with relatively simple components. Actually the accuracy achieved, instead of being something less than the most precise part (as is usually the case), is considerably more than the most precise part. The parts, therefore, need not be expensive or carefully worked, with the sole exception of the final lapped mounting surface on table 25. I thus provide an inexpensive device to do the work of an ultraprecision fixture.

An end cap 35 and cover 36 define a pressure chamber 37 at the lower end of the spindle 16. Air is supplied under pressure from a suitable source, through a pressure regulator 38 and aperture 39 into chamber 37. A gage 40 may be used to indicate pressure conditions. A variable orifice 41 may be set to balance flow into chamber 37 with leakage therefrom through the clearance between spindle 16 and the member 13. A plate 42 may further control the passage of air from chamber 37 and additional leakage paths at 42a may be provided if desired.

Air is also supplied under pressure through an aperture 43 to the annular manifold 15. This manifold, as explained above, communicates with the interstices between the spindle and its mount via passageways in the plugs 18, 19, and 20.

The spindle may be driven by means of a pin 44 fitting loosely in drilled hole 45. The pin 44 is rotated through a drive by means of a cogged belt 46 at a suitable speed by a light duty electric motor, not shown. Such a drive transmits rotational torque only with lateral forces eliminated or minimized.

In use, I may station the work table 25 in the low position, at which point the spindle rests on pressure pads developed between the plugs 18 and the lower surface of plate 23. In this position no air is supplied through aperture 39, and the spindle is also radially balanced in position within the bore of member 13. The air pads at each plug 19 and 20 (there may be 18 of each surrounding the spindle) and the air film resulting over the entire spindle surface create an averaging effect and a very precise orientation of the spindle. Thus the drive through pin 44 may rotate the spindle with virtually frictionless resistance, and with runout of something under three millionths of an inch.

Figure 2:
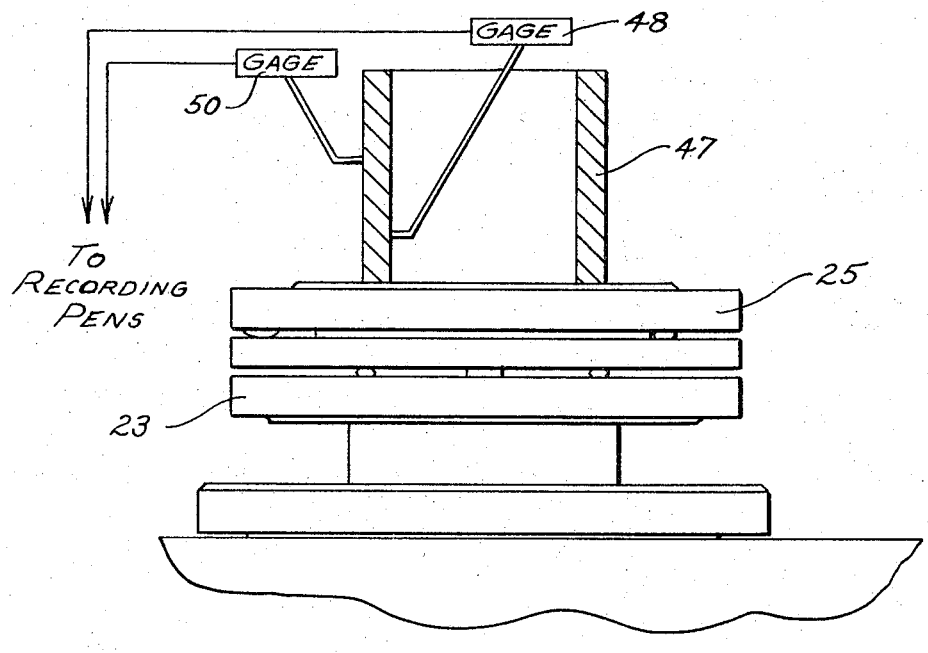
FIGURE 2 is a view in elevation of the staging table carried by the spindle with a workpiece to be measured thereon.

With a workpiece 47 on the table 25 (FIGURE 2) roundness and concentricity checks on the inner and outer surfaces may be made and recorded by means of gaging heads 48 and 50, after the double tilt adjustment of the table surface has placed the plane of rotation in proper relationship (usually normal) to the spindle axis. It is often necessary to indicate straightness and the relationship of surfaces from one end of a workpiece to the other. To make such measurements, it is merely necessary to admit air under pressure to chamber 37, and the spindle will rise at a controlled rate, with gage heads 48 and 50 registering deviations from a straight line generated by workpiece error. Gage heads may deliver signals to drive recording pens, which register their outputs on strip or polar grid charts for a permanent record as desired.

Figure 4:
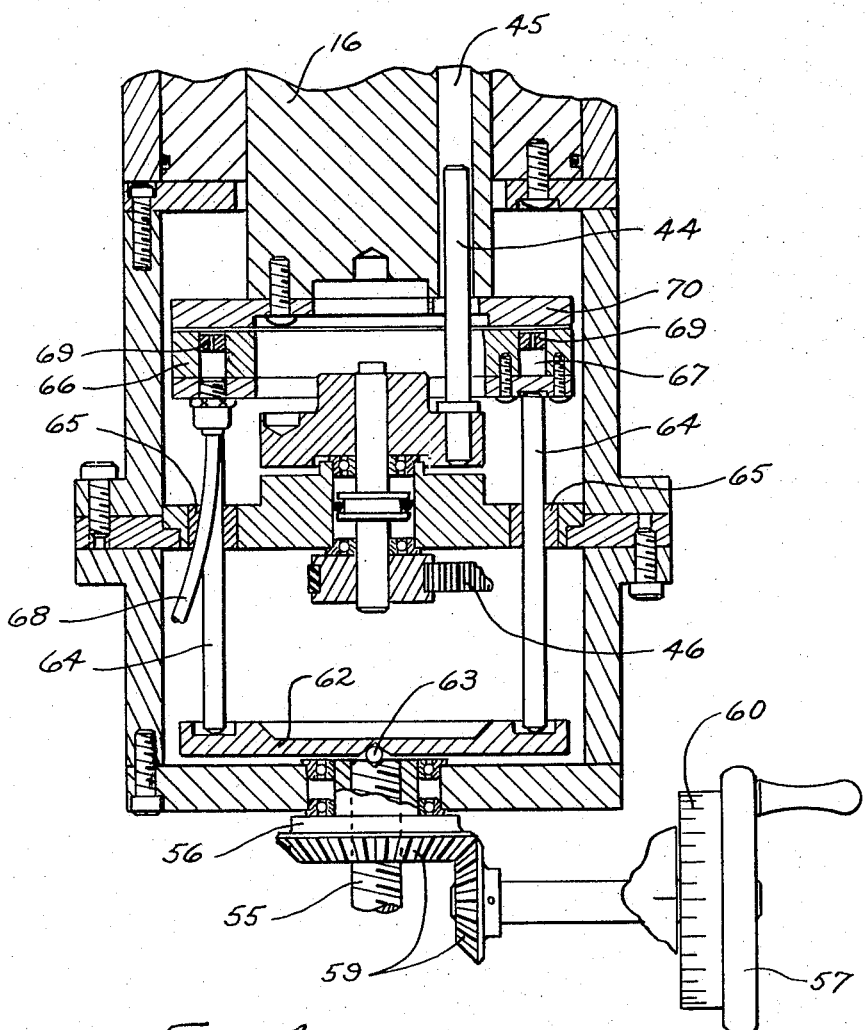
FIGURE 4 illustrates an alternative construction for elevating the spindle.

Further roundness and concentricity checks can be made at selected points along a workpiece, with a complete geometric description of the part produced and its deviation from an ideal standard detected. To facilitate moving the spindle axially to selected planes along the axis of a workpiece, I prefer the elevating arrangement shown in FIGURE 4. In place of the air pressure means described above, I can provide a lead screw and nut combination as shown. The lead screw 55 engages a nut 56, which may be driven rotationally by a suitable handwheel 57. For convenience, the handwheel drive may be translated ninety degrees by a bevel gear pair 59; and a circular scale 60 graduated in thousandths of an inch provides the desired indication of vertical position. Vertical positional accuracy is not nearly as critical as the rotational accuracies provided by the spindle construction and air support as hereinbefore described. Therefore the mechanical drive to a reasonably accurate lead screw suffices in most industrial applications.

However, the coupling of the mechanical drive to the spindle is very critical, and here ordinary mechanical methods are not acceptable. I combine here the advantages of the above described air method, using chamber 37 of FIGURE 1, with a mechanical drive capable of indicating position by inexpensive means.

To this end the lead screw 55 is loosely coupled to a plate 62 via a ball 63. Rotational drive of the spindle is provided through cogged belt 46 as in the previously described construction. A plurality of pins 64 guided in bushings 65 transmit only vertical movement of the plate 62 to a thrust ring 66 containing an air manifold 67. Air supplied under suitable pressure through flexible pipe 68 enters the manifold 67 and escapes through a plurality of apertures in plugs 69. The plugs 69 are press-fitted to a position slightly below the top plane of thrust ring 66 to provide a series of pressure pads arranged around the circumference of the ring 66 and supporting the spindle at the enlarged base thereof provided by the disk 70.

It will be seen that there are no fixed or rigid mechanical links between the lead screw drive and the spindle. The thrust ring is free to float and find that particular plane at which the series of pressure pads at plugs 69 are in balance. This accommodating motion finds its outlet about ball 63 nested between the lead screw 55 and plate 62. Thus the spindle may be elevated on a series of spaced air cushions with substantially no off-center thrust forces inherent in other mechanical drives. Here again, the precision of individual components is not the measure of the ultimate performance of the drive. Since gravity keeps the drive coupled together, the readings on scale 60 are repeatable without concern for mechanical backlash.

The pins 64 are a convenient way of providing space between the plate 62 and the thrust ring 66. In this particular application, this space is provided for the rotatable drive to the spindle. In other configurations it would be possible, within the scope of the invention, to have the manifold 67 integral with the plate. The ball 63 is an effective and inexpensive universal joint between the screw and the plate. In a horizontal device, a universal joint might be used instead.

The spindle cannot be damaged by shock loads, and is insensitive to reasonable temperature variations. The original accuracy is permanent due to the dynamic, pneumatic mounting with no frictional wear whatever. Repeatability is excellent; the spindle always rotates on the same axis and, if forcibly displaced, returns with no hysteresis. While my device is accurate to the best laboratory standards, it can therefore be used under normal shop conditions to stage parts for precision measurement by rotation, and axial translation. I have found that at a given setting of orifice 41, the spindle will come to rest with the surface of table 25 in a given plane, at which point measurements may be taken with no significant variations in vertical position over long periods of time. Repeatability to the "zero" position with the under surface of plate 23 resting on air pads at plugs 18 is at least an order of magnitude better than mechanical fixtures using lead screws or other types of frictional elements.

The advantages of my device are apparent and include:

(1) Extreme accuracy can be obtained through the use of the hydrostatic bearing concept and the error averaging effect of the air films. In this way a final instrument accuracy is obtained which is better than the accuracy of the component parts.

(2) Because of the hydrostatic support, the spindle rotates without vibration, cannot be damaged by overloading or mishandling, and is relatively insensitive to vibration and temperature variations.

(3) Combining the rotational and straightness accuracy in one set of mechanical elements reduces the number of parts that must be produced to high accuracy, and thus reduces the overall cost of the instrument.

(4) Combining the rotational and straightness elements into a unitary design reduces the effects of temperature, mechanical stress and movement, usually experienced in trying to obtain this same degree of accuracy with separate spindles, slides, or other components.

(5) One single staging of a part for all geometry checks on one instrument reduces total inspection time, and further contributes to accuracy by eliminating errors due to repositioning.

While I have described a particular embodiment of my invention for illustrative purposes, variations may be made within the spirit and scope of the following claims. For example, a variety of fluids, as well as air, may be used in my device as described, comprehending in the term fluid any suitable gaseous medium or liquid medium such as hydraulic fluid or oil.

I claim:

1. A device for staging, rotating and axially translating workpieces comprising, a housing, a spindle rotatable and slidable within said housing, a pressure chamber in said housing and surrounding said spindle, a plurality of passages circumferentially placed around said spindle and connecting said chamber with the surface of said spindle, a second pressure chamber defined by said housing and one end of said spindle, and means for supplying fluid under pressure to said pressure chambers whereby said spindle is centered and moved axially within said housing.

2. A device according to claim 1, in which said means are variable and in which leakage passageways are provided to control the axial motion of said spindle.

3. A coupling between a rotatable spindle and mechanical means for the axial translation of said spindle comprising, an element to provide axial motion of said spindle, a plate pivotally mounted and free to tilt in any plane with respect to the axis of motion of said element, a manifold ring mechanically coupled to said plate, a series of outlets from said manifold, and means to provide fluid to said ring whereby a series of pressure pads are established between said ring and the end of said spindle when said spindle rests against said ring.

4. A coupling according to claim 3 in which said element is a lead screw-nut combination, and said plate rests on a ball positioned at the end of said screw.

5. A coupling according to claim 3 in which said manifold ring is spaced from said plate by a plurality of pins.

6. A coupling according to claim 3 including a graduated scale to indicate the axial position of said element.

No references cited.

EDGAR W. GEOGHEGAN, *Primary Examiner.*